United States Patent
Wen et al.

(10) Patent No.: US 11,557,027 B2
(45) Date of Patent: Jan. 17, 2023

(54) VISION INSPECTION SYSTEM AND METHOD OF INSPECTING PARTS

(71) Applicants: TE Connectivity Services GmbH, Schaffhausen (CH); Tyco Electronics (Shanghai) Co., Ltd., Shanghai (CN)

(72) Inventors: Du Wen, Reading, PA (US); Lei Zhou, Shanghai (CN); Tim Darr, York, PA (US); Roberto Francisco-Yi Lu, Bellevue, WA (US)

(73) Assignees: Tyco Electronics Shanghai Co. Ltd.; TE Connectivity Solutions GmbH

( * ) Notice: Subject to any disclaimer, the term of this patent is extended or adjusted under 35 U.S.C. 154(b) by 156 days.

(21) Appl. No.: 16/853,376

(22) Filed: Apr. 20, 2020

(65) Prior Publication Data

US 2021/0319545 A1    Oct. 14, 2021

(51) Int. Cl.
  *G06T 7/55*    (2017.01)
  *G06T 7/00*    (2017.01)
  *G06K 9/62*    (2022.01)
  *G06V 10/40*   (2022.01)

(52) U.S. Cl.
  CPC .......... *G06T 7/0004* (2013.01); *G06K 9/6262* (2013.01); *G06T 7/55* (2017.01); *G06V 10/40* (2022.01); *G06T 2207/20081* (2013.01)

(58) Field of Classification Search
  CPC .............. G06T 7/0004; G06T 7/55; G06T 2207/20081; G06K 9/46; G06K 9/6262; G06K 2209/40; G06K 9/6202; G06K 2209/19; G06K 9/62

USPC .................. 382/141, 100; 348/92
  See application file for complete search history.

(56) References Cited

U.S. PATENT DOCUMENTS

| | | | | |
|---|---|---|---|---|
| 5,680,215 | A  * | 10/1997 | Huber ................. | G01B 11/306 356/237.1 |
| 2014/0346097 | A1* | 11/2014 | Kujacznski ............ | G01N 21/89 209/587 |
| 2015/0057961 | A1* | 2/2015  | Montoya ............. | G06F 11/2294 702/121 |
| 2019/0164270 | A1* | 5/2019  | Wardell ................ | G06T 7/0004 |

\* cited by examiner

*Primary Examiner* — Sheela C Chawan

(57) ABSTRACT

A vision inspection system includes a sorting platform having an upper surface supporting parts for inspection, wherein the parts are configured to be loaded onto the upper surface of the sorting platform in a random orientation. The vision inspection system includes an inspection station including an imaging device. The vision inspection system includes a vision inspection controller receiving images and processing the images based on an image analysis model to determine inspection results for each of the parts. The vision inspection controller has a shape recognition tool configured to recognize the parts in the field of view regardless of the orientation of the parts on the sorting platform. The vision inspection controller has an AI learning module operated to customize and configure the image analysis model based on the images received from the imaging device.

22 Claims, 2 Drawing Sheets

VISION INSPECTION SYSTEM AND METHOD OF INSPECTING PARTS

CROSS REFERENCE TO RELATED APPLICATIONS

This application claims benefit to Chinese Application No. 202010265761.5, 7 Apr. 2020, the subject matter of which is herein incorporated by reference in its entirety.

BACKGROUND OF THE INVENTION

The subject matter herein relates generally to vision inspection systems.

Inspection systems are used for inspecting parts during a manufacturing process. Conventional inspection systems use personnel to manually inspect parts as the parts move along a conveyor. Defective parts are removed from the conveyor. Such manual inspection systems are labor intensive and high cost. The manual inspection systems have low detection accuracy leading to poor product consistency. Additionally, manual inspection systems suffer from human error due to fatigue, such as missed defects, wrong counts, misplacing of parts, and the like.

Some known inspection systems use machine vision for inspecting parts. The machine vision inspection systems use cameras to image the parts. The imaging systems typically require the parts to be in a particular orientation for analysis. Such inspection systems have limited throughput as the parts typically utilize fixturing to locate the part for imaging. The fixturing needs to be set up when changing between various parts, which is time consuming.

A need remains for a vision inspection system that may be operated in a cost effective and reliable manner.

BRIEF DESCRIPTION OF THE INVENTION

In an embodiment, a vision inspection system is provided including a sorting platform having an upper surface supporting parts for inspection, wherein the parts are configured to be loaded onto the upper surface of the sorting platform in a random orientation. The vision inspection system includes an inspection station positioned adjacent the sorting platform including an imaging device to image the parts in a field of view above the upper surface. The vision inspection system includes a vision inspection controller receiving images from the imaging device and processing the images from the imaging device based on an image analysis model. The vision inspection controller has a shape recognition tool configured to recognize the parts in the field of view regardless of the orientation of the parts on the sorting platform. The vision inspection controller processes the images to determine inspection results for each of the parts. The vision inspection controller has an artificial intelligence learning module operated to update the image analysis model based on the images received from the imaging device.

In an embodiment, a vision inspection system is provided including a sorting platform having an upper surface supporting parts for inspection, wherein the parts are configured to be loaded onto the upper surface of the sorting platform in a random orientation. The vision inspection system includes an inspection station positioned adjacent the sorting platform including an imaging device to image the parts in a field of view above the upper surface. The vision inspection system includes a vision inspection controller receiving images from the imaging device and processing the images from the imaging device based on an image analysis model. The vision inspection controller has a shape recognition tool configured to recognize the parts in the field of view regardless of the orientation of the parts on the sorting platform. The vision inspection controller processes the images to determine inspection results for each of the parts. The vision inspection controller has an artificial intelligence learning module operated to update the image analysis model based on the images received from the imaging device. The vision inspection system includes a sorting device positioned adjacent the sorting platform including a part manipulator configured to interface with the parts for sorting the parts based on the inspection results.

In an embodiment, a method of inspecting parts is provided including loading the parts on an upper surface of a sorting platform configured to be loaded onto the upper surface of the sorting platform in a random orientation, moving the parts in a feeding direction along the sorting platform, and imaging the parts at an inspection station positioned adjacent the sorting platform using an imaging device to image the parts in the random orientations on the upper surface. The method includes receiving images from the imaging device at a vision inspection controller having a shape recognition tool configured to recognize the parts in the field of view regardless of the orientation of the parts on the sorting platform, processing the images from the imaging device at the vision inspection controller based on an image analysis model to determine inspection results for the parts, and updating the image analysis model using an artificial intelligence learning module to configure the image analysis model based on the images received from the imaging device.

DETAILED DESCRIPTION OF THE INVENTION

Figure 1:
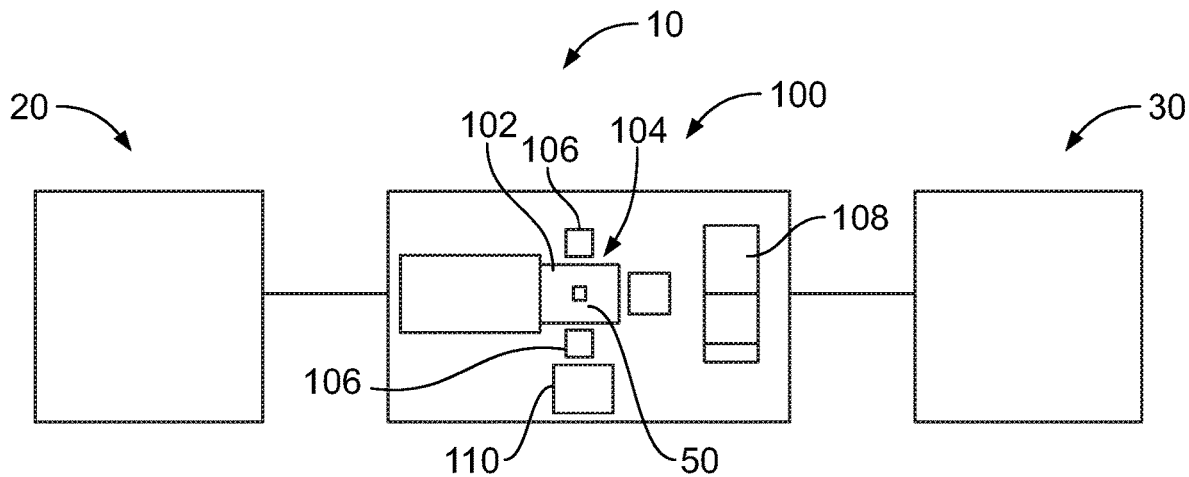
FIG. 1 is a schematic illustration of a machine for manufacturing parts in accordance with an exemplary embodiment.

FIG. 1 is a schematic illustration of a machine 10 for manufacturing parts 50, such as parts used in electrical connectors. For example, the parts 50 may be contacts, housings, circuit boards, or other types of parts. The machine 10 may be used for manufacturing parts used in other industries. The machine 10 includes one or more forming machines 20 used to form various parts 50. For example, the forming machines 20 may include a molding machine, a press, a lathe, and the like. The machine 10 includes a vision inspection system 100 used to inspect the various parts 50. The machine 10 includes one or more processing machines 30 used for processing the various parts 50. For example, the processing machines 30 may include assembly machines, packaging machines, and the like. For example, in various embodiments, the parts 50 may be assembled, such as at an assembly station, prior to packaging, such as at a packing station. The parts 50 are transported between the forming machines 20 and the vision inspection system 100. The vision inspection system 100 is used for quality inspection of the parts 50 and removes defective parts for scrap or further inspection. The acceptable parts 50 that have passed inspection by the vision inspection system 100 are transported between the vision inspection system 100 and the processing machines 30.

The vision inspection system 100 includes a sorting platform 102 that supports the parts 50 through the vision inspection system 100. The sorting platform 102 may be used to feed or move the parts 50 through the vision inspection system 100. In an exemplary embodiment, the parts 50 may be loaded onto the sorting platform 102 in any random orientation (for example, facing forward, facing rearward, facing sideways, and the like). The sorting platform 102 is able to support the parts without the need for fixturing, which increases the throughput of the parts 50 through the vision inspection system 100. The vision inspection system 100 includes an inspection station 104 having one or more imaging devices 106 that image the parts 50 on the sorting platform 102 within a field of view of the imaging device(s) 106. In the illustrated embodiment, the vision inspection system 100 includes multiple imaging devices 106 for imaging different sides of the parts 50. Optionally, all sides (for example, top, bottom, front, rear, first side and second side) may be imaged with the multiple imaging devices 106. The imaging device 106 is able to image the parts 50 in the random orientations. The vision inspection system 100 includes a vision inspection controller 108 that receives the images from the imaging device 106 and processes the images to determine inspection results. For example, the vision inspection controller 108 determines if each part 50 passes or fails inspection. The vision inspection controller 108 may reject parts 50 that are defective. The images, with the parts in any of the various, random orientations, are able to be processed by the vision inspection controller 108. In an exemplary embodiment, the vision inspection controller 108 includes a shape recognition tool configured to recognize the parts 50 in the field of view regardless of the orientation of the parts 50 on the sorting platform 102. In an exemplary embodiment, the vision inspection controller 108 includes an artificial intelligence (AI) learning module used to update image analysis based on the images received from the imaging device 106. The vision inspection controller 108 may be updated and trained in real time during operation of the vision inspection system 100. The vision inspection system 100 includes a sorting device 110 for sorting the parts 50 based on the inspection results. For example, the sorting device 110 may separate the acceptable parts from the defective parts. The sorting device 110 may be multi-axis robot manipulator configured to grip and pick the parts off of the sorting platform 102. In other various embodiments, the sorting device 110 may include a pusher or ejector configured to push the acceptable and/or the defective parts off of the sorting platform 102.

In an exemplary embodiment, the vision inspection system 100 may be used to inspect different types of parts 50. For example, the vision inspection system 100 may be used to inspect different sized parts, different shaped parts, parts in different orientations, and the like. In an exemplary embodiment, the parts 50 may be quickly loaded onto the sorting platform 102 without the need for orienting the parts 50 in a particular orientation and without the need for fixturing, which allows the parts 50 to be imaged quickly and efficiently. The parts 50 do not need to be rotated or turned to image the parts 50 in a particular orientation. The critical area of interest of the parts 50 may be imaged regardless of the orientation.

Figure 2:
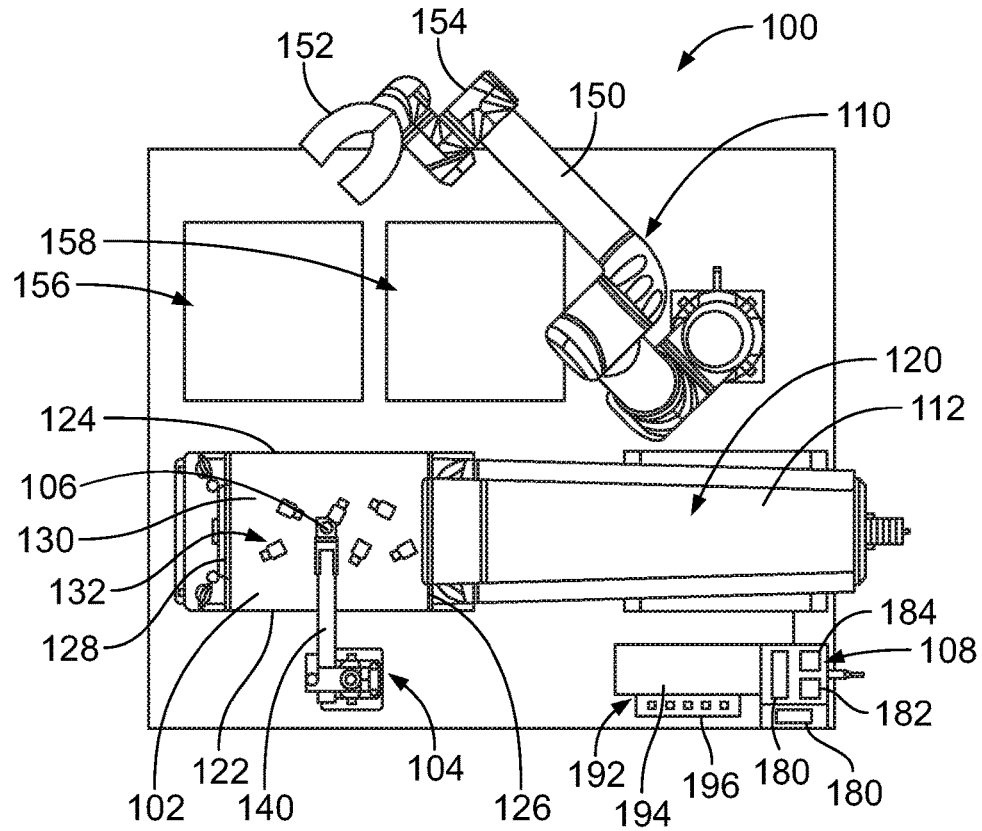
FIG. 2 is a top view of a vision inspection system of the machine in accordance with an exemplary embodiment.

FIG. 2 is a top view of the vision inspection system 100 in accordance with an exemplary embodiment. The vision inspection system 100 includes the sorting platform 102, the inspection station 104, the vision inspection controller 108, and the sorting device 110. In an exemplary embodiment, the vision inspection system 100 includes a part feeding device 112. The parts 50 are loaded onto the sorting platform 102 by the part feeding device 112, which may include a hopper, a conveyor, or another type of feeding device. The parts 50 are presented to the inspection station 104 on the sorting platform 102. The parts 50 may be advanced or fed along the sorting platform 102 to or through the inspection station 104 for inspection of the parts 50. The parts 50 are removed from the sorting platform 102 by the sorting device 110.

In an exemplary embodiment, the part feeding device 112 includes a bin 120 for holding a supply of the parts 50. The parts 50 are fed from the bin 120 to the sorting platform 102, such as by a hopper or conveyor. The parts 50 may be guided to a particular location of the sorting platform 102, such as proximate to a center of the sorting platform 102 between a first side 122 and a second side 124 of the sorting platform 102. The parts 50 may be loaded onto the sorting platform 102, such as proximate to a rear 126 of the sorting platform 102, and advanced forward by or on the sorting platform 102 toward the front 128 of the sorting platform 102. Other types of part feeding devices 112 may be provided in alternative embodiments.

The sorting platform 102 includes a plate 130 having an upper surface 132 used to support the parts 50. The plate 130 may be a vibration tray that is vibrated to advance the parts 50 from the rear 126 toward the front 128. The plate 130 may be rectangular. However, the plate 130 may have other shapes in alternative embodiments.

The inspection station 104 includes one or more imaging devices 106 (a single imaging device 106 is illustrated in FIG. 2) arranged adjacent the sorting platform 102. The imaging device 106 may be located above the upper surface 132 and view the parts 50 arranged on the upper surface 132. The imaging device 106 is used to image the parts 50 regardless of the orientation of the parts 50 on the upper surface 132. In alternative embodiments, the vision inspection system 100 includes multiple imaging devices 106 for imaging different sides of the parts 50, such as the top, bottom, front, rear, first side and second side of the parts 50. The multiple imaging devices 106 may image the parts from different directions. The imaging device 106 may be a camera, such as a visible light camera, an infrared camera, and the like. The field of view of the imaging device 106 may be approximately centered between first and second sides 122, 124 of the sorting platform 102. The field of view of the imaging device 106 may be approximately centered between the rear 126 and the front 128 of the sorting platform 102.

In an exemplary embodiment, the imaging device 106 is mounted to a position manipulator 140 for moving the imaging device 106 relative to the sorting platform 102. The position manipulator 140 may be an arm or a bracket that supports the imaging device 106. In various embodiments, the position manipulator 140 may be positionable in multiple directions, such as in two-dimensional or three-dimensional space. The position manipulator 140 may be automatically adjusted, such as by a controller that controls positioning of the position manipulators 140. The position manipulator 162 may be adjusted by another control module, such as an IR control module. In other various embodiments, the position manipulator 140 may be manually adjusted. The position of the imaging device 106 may be adjusted based on the types of parts 50 being imaged. For example, when a different type of part 50 is being imaged, the imaging device 106 may be moved based on the type of part being imaged.

The sorting device 110 is positioned adjacent the sorting platform 102. The sorting device 110 may be used to separate acceptable parts from defective parts based on input from the imaging device 106. In an exemplary embodiment, the sorting device 110 includes a robot arm 150 and a gripper 152 at a distal end 154 of the robot arm 150. In various embodiments, the robot arm 150 is a four-axis robot arm or a six-axis robot arm. Other types of robot arms 150 may be used in alternative embodiments. The parts 50 are picked off of the sorting platform 102 by the gripper 152. The sorting device 110 is operated to remove the parts 50 from the sorting platform 102, such as the acceptable parts and/or the defective parts. The parts 50 may be moved to collection bins, such as a first collection bin 156 for the acceptable parts and a second collection bin 158 for the defective parts. In various embodiments, the sorting device 110 is operated to remove all of the parts and place each of the parts in the corresponding collection bin 156, 158. In other various embodiments, the sorting device 110 is operated to remove only the acceptable parts to the first collection bin 156, leaving the defective parts to be dropped into the second collection bin 158 (located at the front 128 of the sorting platform 102) as the parts 50 are advanced in the feed direction. In other various embodiments, the sorting device 110 is operated to remove only the defective parts to the second collection bin 158, leaving the acceptable parts to be dropped into the first collection bin 156 (located at the front 128 of the sorting platform 102) as the parts 50 are advanced in the feed direction. Other types of part removal devices may be used in alternative embodiments, such as pushers, ejectors, and the like.

The vision inspection controller 108 is operably coupled to the imaging device 106 and the sorting device 110 for controlling operation of the sorting device 110. The imaging device 106 communicates with the vision inspection controller 108 through machine vision software to process the data, analyze results, record findings, and make decisions based on the information. The machine vision software may be integrated with or communicate with an AI learning module of the machine 10. The AI learning module may be updated based on image processing by the machine vision software. The vision inspection controller 108 provides consistent and efficient inspection automation. The vision inspection controller 108 determines the quality of manufacture of the parts 50, such as determining if the parts 50 are acceptable or are defective. The vision inspection controller 108 identifies defects in the parts, when present. The vision inspection controller 108 determines the orientations of the parts 50. The vision inspection controller 108 controls operation of the sorting device 110 based on the identified orientation of the parts 50.

The vision inspection controller 108 receives the images from the imaging device 106 and processes the images to determine inspection results. In an exemplary embodiment, the vision inspection controller 108 includes one or more processors 180 for processing the images. The vision inspection controller 108 determines if each part 50 passes or fails inspection. The vision inspection controller 108 controls the sorting device 110 to remove the parts 50, such as the acceptable parts and/or the defective parts, into the collection bins 156, 158. In an exemplary embodiment, the vision inspection controller 108 includes a shape recognition tool 182 configured to recognize the parts 50 in the field of view regardless of the orientation of the parts 50 on the sorting platform 102. The shape recognition tool 182 may be integrated with or communicate with the AI learning module of the machine 10. The AI learning module may be updated based on image processing by the shape recognition tool 182. The shape recognition tool 182 is able to recognize and analyze the image of the part if the part is forward facing, rearward facing, sideways facing, or at another angular orientation. The shape recognition tool 182 may determine an orientation offset, such as an angular offset from a base orientation. For example, the base orientation may be with a front of the part in a forward orientation. If the part is oriented with the front of the part being rearward facing, the orientation offset is a 180° offset. If the part is oriented with the front of the part being sideways facing, the orientation offset is a 90° or a 180° offset. Other offset angles are possible in alternative embodiments, such as at any angular offset between 0° and 360°. The orientation offset is used by the vision inspection controller 108 in analysis and processing of the images.

Once the images are received, the images are processed based on an image analysis model. The orientation offset determined by the shape recognition tool 182 is used to compare the images with the image analysis model. The images are compared to the image analysis model, in a correlated orientation, to determine if the part 50 has any defects. The image analysis model may be a three-dimensional model defining a baseline structure of the part being imaged. In other various embodiments, the image analysis model may be a series of two-dimensional models, such as for each imaging device 106. The image analysis model may be based on images of known or quality passed parts, such as during a learning or training process. The image analysis model may be based on the design specifications of the part 50. For example, the image analysis model may include design parameters for edges, surfaces, and features of the part. The image analysis model may include tolerance factors for the parameters, allowing offsets within the tolerance factors. During processing, the images may be individually processed or may be combined into a digital model of the part, which is then compared to the image analysis model. The images are processed based on the image analysis model to detect defects, such as short shot defects, flash defects, black dots, dirt, dents, scratches, or other types of defects. The images may be processed by performing pattern recognition of the images based on the image analysis model. For example, in an exemplary embodiment, the vision inspection controller 108 includes a pattern recognition tool 184 configured to compare patterns or features in the images to patterns or features in the image analysis model. The pattern recognition tool 184 may be integrated with or communicate with the AI learning module of the machine 10. The AI learning module may be updated based on image processing by the pattern recognition tool 184. The images may be processed by performing feature extraction of boundaries and surfaces detected in the images and comparing the boundaries and surfaces to the image analysis model. The vision inspection controller 108 may identify lines, edges, bridges, grooves, or other boundaries or surfaces within the image. The vision inspection controller 108 may perform contrast enhancement and or noise reduction of the images during processing. The vision inspection controller 108 may identify areas of interest within the image for enhanced processing. The vision inspection controller 108 may perform image segmentation during processing.

In an exemplary embodiment, the vision inspection controller 108 includes an artificial intelligence (AI) learning module 190. The AI learning module 190 uses artificial intelligence to train the vision inspection controller 108 and improve inspection accuracy of the vision inspection controller 108. The AI learning module 190 updates the image analysis model based on the images received from the imaging device 106. For example, the image analysis model may be customized and configured by the AI learning module 190. The AI learning module 190 may be operated based on data from the machine vision software, the shape recognition tool 182, and/or the pattern recognition tool 184. The images forming the basis of the image analysis model may be revised or updated based on images taken by the imaging devices 106, using the AI learning module 190. For example, the image analysis model may be based on multiple images, which are updated or expanded based on images from the AI learning module 190. As the AI learning module expands the image analysis model, the quality of the image processing may be improved. The vision inspection controller 108 is updated and trained in real time during operation of the vision inspection system 100. The AI learning module 190 of the vision inspection controller 108 may be operable in a learning mode to train the vision inspection controller 108 and develop the image analysis model. For example, the machine vision software, the shape recognition tool 182, and/or the pattern recognition tool 184 may be updated or trained based on data from the AI learning module 190. The image analysis model changes over time based on input from the AI learning module 190 (for example, based on images of the parts 50 taken by the imaging device 106). In alternative embodiments, the AI learning module 190 may be a separate module from the vision inspection controller 108 independently operable from the vision inspection controller 108. For example, the AI learning module 190 may be separately coupled to the imaging devices 106 or other components of the machine 10.

In an exemplary embodiment, the vision inspection controller 108 includes a user interface 192. The user interface 192 includes a display 194, such as a monitor. The user interface 192 includes one or more inputs 196, such as a keyboard, a mouse, buttons, and the like. An operator is able to interact with the vision inspection controller 108 with the user interface 192.

Figure 3:
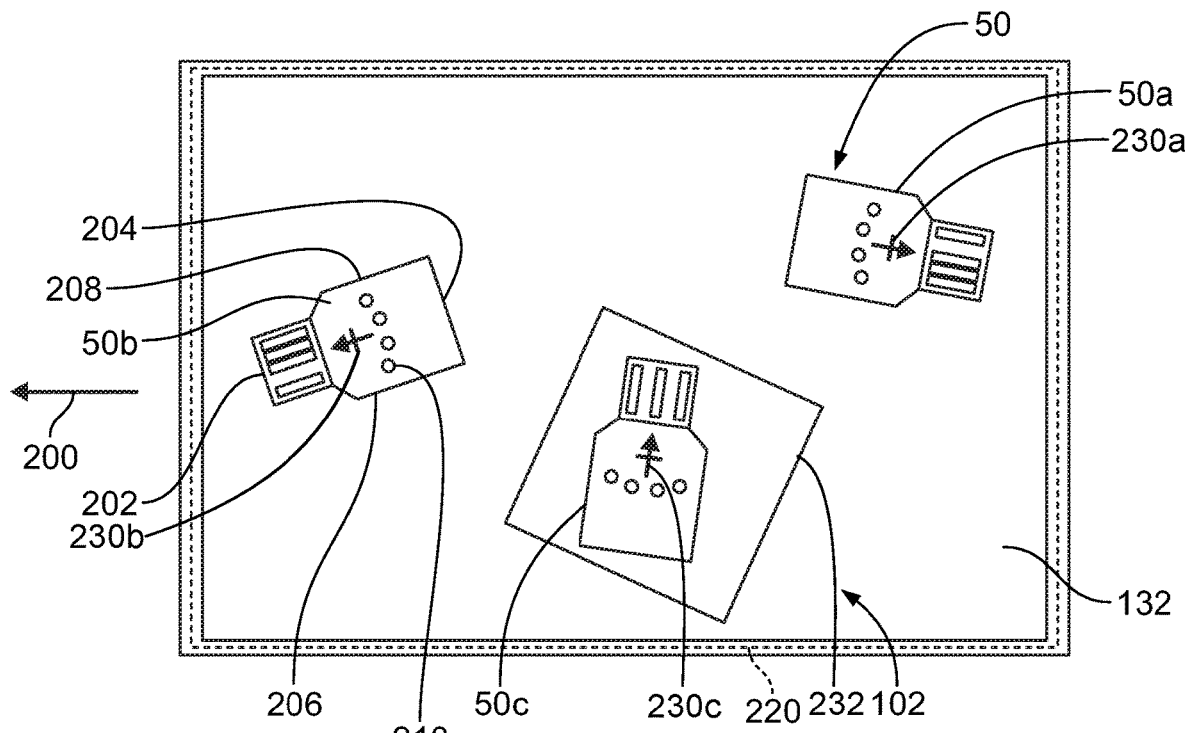
FIG. 3 illustrates an image of the parts on a sorting platform of the vision inspection system in accordance with an exemplary embodiment.

FIG. 3 illustrates an image of the parts 50 on the sorting platform 102 in accordance with an exemplary embodiment. The parts 50 are movable along the sorting platform 102 in a feeding direction 200 (in a north direction in the illustrated embodiment). In the illustrated embodiment, the parts 50 are connector housings. The parts 50 are generally rectangular shaped having a front 202, a rear 204, a first side 206 and a second side 208. The parts 50 have a top 210 and a bottom resting on the sorting platform 102. The parts 50 may have other shapes in alternative embodiments.

The parts 50 are arranged along the upper surface 132 and are oriented in random orientations. For example, a first part 50*a* has a generally forward orientation (for example, the front 202 is generally north facing), a second part 50*b* has a generally rearward orientation (for example, the front 202 is generally south facing), and a third part 50*c* has a generally sideways orientation (for example, the front 202 is generally east facing). Other orientations are possible in alternative embodiments.

The imaging device 106 (shown in FIG. 2) images a field of view 220, which may have multiple parts 50, as in the illustrated embodiment. The images are sent to the vision inspection controller 108 (shown in FIG. 2) and processed by the vision inspection controller 108. The shape recognition tool 182 recognizes the parts 50 in the field of view 220 regardless of the orientation of the parts 50 on the sorting platform 102. The shape recognition tool 182 determines an orientation heading 230 of each of the parts 50. The orientation heading 230 is defined along a predetermined axis of the part 50, such as a central longitudinal axis with the orientation heading 230 facing the front 202 of the part. The shape recognition tool 182 determines an orientation heading 230 of each part based on the orientation heading 230. The orientation heading 230 is an angular offset from a base orientation, such as the feeding direction 200. In the illustrated embodiment, the first part 50*a* has an orientation heading 230*a* of approximately 350° (or −10°), the second part 50*b* has an orientation heading 230*b* of approximately 180°, and the third part 50*c* has an orientation heading 230 of approximately 80°. Other offset angles are possible in alternative embodiments, such as at any angular offset between 0° and 360°. The orientation offset is used by the vision inspection controller 108 in analysis and processing of the images.

In the illustrated embodiment, the first part 50*a* passes inspection. The first part 50*a* does not include any recognizable defects. The second part 50*b* does not include any recognizable defects and passes inspection. The third part 50*c* fails inspection and is therefore identified as being defective. For example, the third part 50*c* has a missing component, such as a missing contact (for example, the third part 50*c* only includes three contacts, whereas the first and second parts 50*a*, 50*b* include four contacts). The vision inspection controller 108 identifies the third part 50*c* for removal from the sorting platform 102, such as by the sorting device 110 (shown in FIG. 2). For example, the vision inspection controller 108 may superimpose a highlighted area 232 in the image around the third part 50*c* to identify an area of interest, such as an area including a defective part. The vision inspection controller 108 identifies the orientation of the third part 50*c* for the sorting device 110 to properly pick and remove the third part 50*c*. In an exemplary embodiment, the vision inspection controller 108 identifies the first and second parts 50*a*, 50*b* for removal from the sorting platform 102, such as by the sorting device 110. The vision inspection controller 108 identifies the orientations of the first and second parts 50*a*, 50*b* for the sorting device 110 to properly pick and remove the first and second parts 50*a*, 50*b*.

In an exemplary embodiment, the AI learning module 190 may be operated in a training mode or learning mode. The AI learning module 190 uses data from the images taken by the imaging device 106 to train the vision inspection controller 108. The AI learning module 190 may include a library of images used for comparing the images and determining if the parts 50 pass/fail based on comparison to the library of images. The AI learning module 190 is used to improve inspection accuracy of the vision inspection controller 108. For example, the AI learning module 190 updates the image analysis model based on the images received from the imaging device 106. The vision inspection controller 108 may be updated and trained in real time during operation of the vision inspection system 100 based on the images. The image analysis model changes over time based on input from the AI learning module 190, such as based on the images of the parts 50 imaged by the imaging device 106. The image analysis model may be affected by images determined to be passing images and/or images determined to be failing images.

Figure 4:
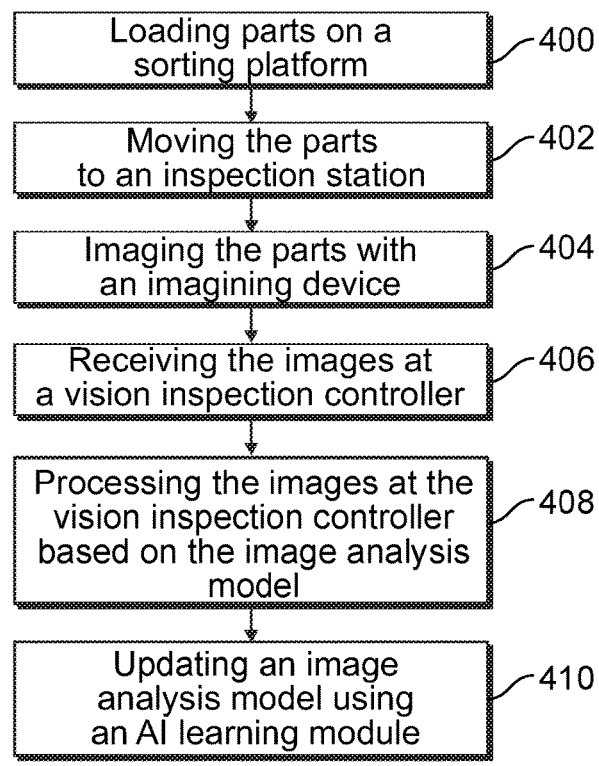
FIG. 4 is a flow chart showing a method of inspecting parts in accordance with an exemplary embodiment.

FIG. 4 is a flow chart showing a method of inspecting parts in accordance with an exemplary embodiment. The method, at 400, includes loading the parts 50 on the sorting platform 102. The parts 50 may be loaded manually or automatically. The parts 50 may be loaded at the rear 126 of the sorting platform 102. The parts 50 may be loaded randomly onto the sorting platform 102, such as at random orientations relative to the feeding direction.

At 402, the method includes moving the parts 50 from a first position to a second position. The parts 50 may be moved by the sorting platform 102, such as using a vibrating tray. In other various embodiments, the parts 50 may be moved by a conveyor, a pusher, or another moving device. In an exemplary embodiment, the parts 50 are moved from the rear 126 of the sorting platform 102 toward the front 128 of the sorting platform 102 into the field of view of the imaging device 106. The orientations of the parts 50 may change as the parts 50 are moved along the sorting platform 102.

At 404, the method includes imaging the parts at the inspection station 104 using the imaging device 106. The imaging device 106 are used to image the parts 50 at any of the various, random orientations. In an exemplary embodiment, the imaging device 106 is located directly above the sorting platform 102 to view the parts 50. The imaging may be performed quickly and efficiently using the imaging device 106 without needing fixturing or other elements to orient the parts 50.

At 406, the method includes receiving the images from the imaging device 106 at the vision inspection controller 108. The images may be transmitted across a data bus. The images may be received and stored in a memory at the vision inspection controller 108.

At 408, the method includes processing the images from the imaging device 106 at the vision inspection controller 108, such as using the shape recognition tool 182 and/or the pattern recognition tool 184. The images are processed based on the image analysis model to determine inspection results for the parts. For example, the images are processed using defect analysis, pattern recognition, part orientation, shape recognition and the like determined by the image analysis model. The image analysis model may be a three-dimensional model defining a baseline structure of the part being imaged. In other various embodiments, the image analysis model may be a series of two-dimensional models, such as for each imaging device 106. The image analysis model may be based on images of known or quality passed parts, such as during a learning or training process. The image analysis model may be based on the design specifications of the part 50. For example, the image analysis model may include design parameters for edges, surfaces, and features of the part. The image analysis model may include tolerance factors for the parameters, allowing offsets within the tolerance factors. During processing, the images may be individually processed or may be combined into a digital model of the part, which is then compared to the image analysis model. The images are processed based on the image analysis model to detect defects. In various embodiments, the vision inspection controller 108 uses the shape recognition tool 182 to recognize the parts 50 in the field of view 220 regardless of the orientation of the parts 50 on the sorting platform 102. The shape recognition tool 182 is used to correlate the orientation of the image with the orientation of the image analysis model for proper comparison. In various embodiments, the images are processed by comparing the image to the image analysis model to determine if the part 50 has any defects. In various embodiments, the images are processed by performing pattern recognition of the images based on the image analysis model using the pattern recognition tool 184. In various embodiments, the images are processed by performing feature extraction of boundaries and surfaces detected in the images and comparing the boundaries and surfaces to the image analysis model.

At 410, the method includes updating the image analysis model using the AI learning module 190 to configure the image analysis model based on the images received from the imaging device 106. The image analysis model is updated based on the images from the imaging device 106. The images forming the basis of the image analysis model may be revised or updated based on images taken by the imaging devices 106, using the AI learning module 190. For example, the image analysis model may be based on multiple images, which are updated or expanded based on images from the AI learning module 190. As the AI learning module expands the image analysis model, the quality of the image processing may be improved. The AI learning module 190 may be trained or updated using data from the image analysis model. For example, the AI learning module 190 may be trained or updated using data from the shape recognition tool 182 and/or the pattern recognition tool 184.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A vision inspection system comprising:
a sorting platform having an upper surface supporting parts for inspection, the parts configured to be loaded onto the upper surface of the sorting platform in a random orientation;
an inspection station positioned adjacent the sorting platform, the inspection station including an imaging device to image the parts in a field of view above the upper surface;
a vision inspection controller receiving images from the imaging device and processing the images from the imaging device based on an image analysis model, the vision inspection controller having a shape recognition tool configured to recognize the parts in the field of view regardless of the orientation of the parts on the sorting platform, the vision inspection controller processing the images to determine inspection results for each of the parts, the vision inspection controller having an artificial intelligence learning module operated to update the image analysis model based on the images received from the imaging device; and a sorting device positioned adjacent the sorting platform for sorting the parts.

2. The vision inspection system of claim 1, wherein the parts rest on the upper surface without fixturing.

3. The vision inspection system of claim 1, wherein the shape recognition tool is updated by the artificial intelligence learning module.

4. The vision inspection system of claim 1, wherein the sorting platform includes a vibration tray to feed the parts in a feed direction along the upper surface of the sorting platform, the parts configured to be loaded onto the upper surface of the sorting platform in the random orientation relative to the feed direction.

5. The vision inspection system of claim 1, wherein the vision inspection controller includes a pattern recognition tool analyzing the images to recognize features of the parts, the pattern recognition tool being implemented based on an orientation offset determined by the shape recognition tool.

6. The vision inspection system of claim 1, wherein the sorting device includes a part manipulator configured to interface with the parts for sorting the parts based on the inspection results.

7. The vision inspection system of claim 1, wherein the sorting device includes a robot arm and a gripper at a distal end of the robot arm, the gripper being configured to pick the parts off of the sorting platform based on the inspection results, the robot arm and the gripper being operated based on orientation input from the shape recognition tool.

8. The vision inspection system of claim 1, wherein the image analysis model changes over time based on input from the artificial intelligence learning module.

9. The vision inspection system of claim 1, wherein the inspection results include a pass result if the processed image is acceptable based on the image analysis model and the inspection results include a reject result if the processed image is defective based on the image analysis model.

10. The vision inspection system of claim 1, wherein the vision inspection controller processes the images by performing pattern recognition based on the image analysis model.

11. The vision inspection system of claim 1, wherein the vision inspection controller processes the images by performing feature extraction of boundaries and surfaces in the images and comparing the boundaries and surfaces to the image analysis model.

12. The vision inspection system of claim 11, wherein the artificial intelligence learning module updates the image analysis model based on the boundaries and surfaces extracted from the images.

13. The vision inspection system of claim 1, wherein the imaging device is a first imaging device, the inspection station including a second imaging device for imaging the parts in the field of view from a different angle than the first imaging device.

14. A vision inspection system comprising:
a sorting platform having an upper surface supporting parts for inspection, the parts configured to be loaded onto the upper surface of the sorting platform in a random orientation;

an inspection station positioned adjacent the sorting platform, the inspection station including an imaging device to image the parts in a field of view above the upper surface;

a vision inspection controller receiving images from the imaging device and processing the images from the imaging device based on an image analysis model, the vision inspection controller having a shape recognition tool configured to recognize the parts in the field of view regardless of the orientation of the parts on the sorting platform, the vision inspection controller processing the images to determine inspection results for each of the parts, the vision inspection controller having an artificial intelligence learning module operated to update the image analysis model based on the images received from the imaging device; and a sorting device positioned adjacent the sorting platform, the sorting device including a part manipulator configured to interface with the parts for sorting the parts based on the inspection results.

15. The vision inspection system of claim 14, wherein the shape recognition tool is updated by the artificial intelligence learning module.

16. The vision inspection system of claim 14, wherein the vision inspection controller includes a pattern recognition tool analyzing the images to recognize features of the parts, the pattern recognition tool being implemented based on an orientation offset determined by the shape recognition tool.

17. The vision inspection system of claim 14, wherein the sorting device includes a robot arm and a gripper at a distal end of the robot arm, the gripper being configured to pick the parts off of the sorting platform based on the inspection results, the robot arm and the gripper being operated based on orientation input from the shape recognition tool.

18. The vision inspection system of claim 14, wherein the image analysis model changes over time based on input from the artificial intelligence learning module.

19. The vision inspection system of claim 14, wherein the vision inspection controller processes the images by performing pattern recognition based on the image analysis model.

20. The vision inspection system of claim 14, wherein the vision inspection controller processes the images by performing feature extraction of boundaries and surfaces in the images and comparing the boundaries and surfaces to the image analysis model, the artificial intelligence learning module updating the image analysis model based on the boundaries and surfaces extracted from the images.

21. The vision inspection system of claim 14, wherein the imaging device is a first imaging device, the inspection station including a second imaging device for imaging the parts in the field of view from a different angle than the first imaging device.

22. A method of inspecting parts comprising:
loading the parts on an upper surface of a sorting platform, the parts configured to be loaded onto the upper surface of the sorting platform in a random orientation;

moving the parts in a feeding direction along the sorting platform;

imaging the parts at an inspection station positioned adjacent the sorting platform using an imaging device to image the parts in the random orientations on the upper surface;

receiving images from the imaging device at a vision inspection controller having a shape recognition tool configured to recognize the parts in the field of view regardless of the orientation of the parts on the sorting platform;
processing the images from the imaging device at the vision inspection controller based on an image analysis model to determine inspection results for the parts;
sorting the parts based on the inspection results; and
updating the image analysis model using an artificial intelligence learning module to configure the image analysis model based on the images received from the imaging device.

* * * * *